March 27, 1945.   A. V. SAMMIS   2,372,606
TESTING INSTRUMENT FOR TESTING WATER OUTLETS
Filed March 2, 1944
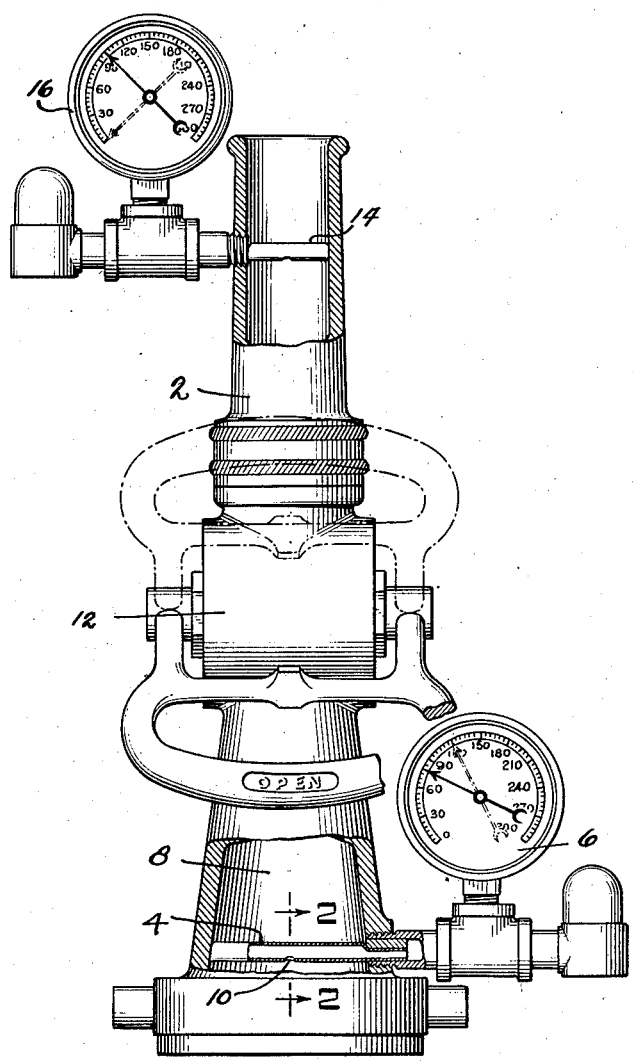
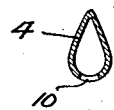
Albert V. Sammis
INVENTOR
BY James G. Bethell
ATTORNEY Patented Mar. 27, 1945

2,372,606

UNITED STATES PATENT OFFICE 2,372,606

TESTING INSTRUMENT FOR TESTING WATER OUTLETS

Albert V. Sammis, Huntington, N. Y.

Application March 2, 1944, Serial No. 524,701

5 Claims. (Cl. 73—168)

This invention relates to apparatus for testing water outlets, and has for one of its objects to provide a device which is simple, compact and accurate, and by which the desired data may be obtained readily.

While my device is capable of use with various types of equipment, it is particularly well fitted for use in connection with the testing of fire fighting equipment, such as water outlets, water systems and pumps.

Let it be assumed, for example, that the static pressure on the water system of a community is thought to be or actually may be 120 p. s. i. Under those conditions, with the water line full open and unobstructed, the dynamic pressure at a hydrant on this system, at the outlet of a 1⅛" nozzle should be approximately 105 p. s. i., for example. In my experience and where the static pressure had been assumed to be and actually was 120 p. s. i. I have seen water outlets where the dynamic pressure at the nozzle tip has only been 15 p. s. i. This, of course, is a very dangerous condition, particularly where a fire hazard is involved. One would naturally assume that if a gauge somewhere on the line upstream from the outlet read 120 p. s. i. then the dynamic pressure at the outlet of a 1⅛" nozzle at the hydrant or outlet would be approximately 105 p. s. i. However, if there is a partially closed valve in the line upstream from the outlet, or if the line is partially plugged by obstructions, sediment or growths, then despite the fact that the static pressure on the line would remain unchanged, the dynamic pressure at the nozzle outlet is much less than it should be.

Then again, I have seen instances on shipboard where the line pressure as indicated by a gauge on the line may be around 60 p. s. i. and yet the dynamic pressure at the outlet was only around 15 p. s. i. instead of the order of 45 p. s. i.

It is to check situations such as those mentioned and to make it easy to obtain a true indication of conditions actually existing that I have invented the present instrument.

In the accompanying drawing:

Fig. 1 is a part sectional elevational view of one embodiment of my invention; and Fig. 2 is a section on the line 2—2 of Fig. 1.

Referring to the drawing in detail: Reference character 2 designates a test pipe adapted to be coupled to an outlet or line to be tested.

Built into the test pipe at or adjacent the base thereof and rigid therewith is Pitot tube 4 communiacting with gauge 6 which is inserted into the test pipe. The tube 4 is disposed precisely across the middle of the water passageway 8 of the test pipe and the entering orifice 10 of the tube is in the exact center or axis of the passageway. In order that there may be the minimum of agitation of the water in the system while testing, thereby to obtain an accurate gauge reading, the tube 4 is streamlined, as illustrated in Fig. 2.

Between the tip of the test pipe and the tube 4, that is, downstream from the tube 4, the test pipe 2 is provided with a shut-off valve 12 built into the pipe.

In addition to the tube 4, the test pipe 2 is provided with Pitot tube 14 communicating with gauge 16 which is inserted into the test pipe. This tube is located intermediate the shut-off valve 12 and the test pipe tip, that is, downstream from the valve and as close to the test pipe tip as it is practicable to install it.

This tube extends across the middle of the test pipe water passageway, and its orifice 10 is in the precise center of the passageway.

In operation the test pipe 2 is attached to the outlet of the line to be tested, and the shut-off valve 12 closed. A reading is then taken on the gauge 6. This gauge will indicate the static pressure on the line or water outlet under test, but gives no reading other than this. The line or water outlet may be nearly closed by a valve, or partially plugged by obstructions, sediment, growths, etc., which of course would not alter the static pressure reading. After noting the reading of the static pressure gauge 6, the shut-off valve 12 is thrown to open position and a reading taken on the dynamic pressure gauge 16.

The ratio of one gauge reading to the other determines whether or not the line is open or only partially open. For example, assuming that the static pressure on the line as indicated by a reading of the gauge 6 is 120 p. s. i., then the dynamic pressure gauge 16 should read approximately 105 p. s. i. with the valve 12 full open and for a 1⅛" test pipe outlet. Should the gauge 16 read materially less than this, then the line is only partially open, or at any rate the dynamic pressure on the line is not what it should be. On shipboard the same type of test may readily be made, and within my experience installations have been encountered where, although the static pressure gauge on the line indicated 60 p. s. i., my instrument showed that the line would only build up a dynamic pressure of 15 p. s. i. This indicates obstructions of some sort in the line, the presence of which would remain undetected in the absence of a test with my improved device.

My instrument, as above pointed out, is useful also for testing pump capacities. It is customary at the present time to test these pumps by running the pump at a predetermined pump pressure, for a given length of time, and to measure the rate of water delivery at the outlet of a layout of 100 ft. or more of hose. Then with a smaller nozzle the pump pressure is raised and the rate of water delivery again measured. A third test is then run with a still higher pressure and still smaller nozzle.

My instrument can be used for this type of testing also and without the necessity of laying hose.

It will be seen from all of the foregoing that my invention provides a testing instrument for the purposes outlined which is exceedingly compact, rugged and simple.

It will be appreciated also that my improved device provides for making tests of this character wherein the static and dynamic pressures are checked in close sequence, without any material time interval. This is of the utmost importance in that it is of no practicable worth to check the static pressure today, for example, and the dynamic pressure tomorrow.

It will be appreciated also that with the systematic use of my instrument on water outlets the danger of only a trickle of water being delivered when a full stream should be delivered is eliminated.

It is to be understood that changes may be made in details of construction and arrangement of parts without departing from the spirit and scope of my invention.

What I claim is:

1. A testing instrument comprising in combination a test pipe, a Pitot tube extending across the same and having its entering orifice precisely in the axis of the test pipe, a gauge cooperative with said tube, a second Pitot tube extending across said test pipe adjacent the test pipe tip and having its entering orifice precisely in alignment with the orifice of the first mentioned tube, a gauge cooperative with said second tube, and a shut-off valve built into the test pipe intermediate said tubes.

2. A testing instrument comprising in combination a test pipe, a streamlined Pitot tube extending across the test pipe and passing through the axis thereof, the said tube being rigidly affixed to the test pipe and its entering orifice being directly in the center of a fluid stream passing through the test pipe, a gauge for said tube, a second streamlined Pitot tube adjacent the test pipe tip, the second tube being in direct alignment with the first tube axially of the test pipe to which it is rigidly secured, a gauge for the second tube, and a shut-off valve built into the test pipe intermediate the two tubes.

3. A testing instrument for testing water outlets comprising in combination a test pipe, a pressure gauge, a Pitot tube extending crosswise of the test pipe and connected into said pressure gauge, a valve built into the test pipe intermediate said gauge and the test pipe tip, a pressure gauge at the tip side of said valve, a second Pitot tube extending crosswise of the test pipe and connected with said second gauge, the first gauge, with said valve closed, indicating the static pressure on the test pipe, and with said valve open indicating the dynamic pressure on the test pipe at the first mentioned Pitot tube, the second gauge being inoperative with said valve closed but operative to indicate the dynamic pressure substantially at the test pipe tip when said valve is in open position.

4. A testing instrument for testing water outlets comprising in combination a test pipe, a pressure gauge, a Pitot tube extending crosswise of the test pipe and connected with said pressure gauge, valve built into the test pipe intermediate said gauge and the test pipe tip, a pressure gauge at the tip side of said valve, a second Pitot tube extending crosswise of the test pipe and connected with said second gauge, the first gauge, with said valve closed, indicating the static pressure on the test pipe, the second gauge with said valve open, indicating the dynamic pressure at the test pipe tip.

5. A testing instrument for testing water outlets comprising in combination a test pipe, a static pressure gauge rigidly secured to said test pipe, a Pitot tube for said gauge extending across the test pipe to which it is rigidly secured, the entering orifice of said tube being in the axis of said test pipe, a valve built into the test pipe intermediate the said Pitot tube and the test pipe tip, a dynamic pressure gauge rigidly secured to the test pipe adjacent the test pipe tip downstream of the valve, a Pitot tube for said second gauge rigidly secured to the test pipe and having its entering orifice in the axis of said test pipe, said static pressure gauge being operative with said valve closed to indicate the static pressure on the test pipe, and when the valve is open to indicate the dynamic pressure on the test pipe at the first mentioned Pitot tube, the second gauge with the valve open indicating the dynamic pressure substantially at the test pipe tip.

ALBERT V. SAMMIS.